United States Patent
Kishi et al.

(10) Patent No.: US 12,488,902 B2
(45) Date of Patent: Dec. 2, 2025

(54) HEALTH SUPPORT APPARATUS, HEALTH SUPPORT METHOD, AND PROGRAM

(71) Applicant: The University of Tokyo, Tokyo (JP)

(72) Inventors: Akiko Kishi, Tokyo (JP); Masahiro Nakamura, Tokyo (JP); Thomas Svensson, Tokyo (JP)

(73) Assignee: The University of Tokyo, Tokyo (JP)

( * ) Notice: Subject to any disclaimer, the term of this patent is extended or adjusted under 35 U.S.C. 154(b) by 249 days.

(21) Appl. No.: 18/013,767

(22) PCT Filed: Jul. 2, 2021

(86) PCT No.: PCT/JP2021/025113
§ 371 (c)(1),
(2) Date: Dec. 29, 2022

(87) PCT Pub. No.: WO2022/004874
PCT Pub. Date: Jan. 6, 2022

(65) Prior Publication Data
US 2023/0352184 A1    Nov. 2, 2023

(30) Foreign Application Priority Data
Jul. 3, 2020 (JP) .................................. 2020-115700

(51) Int. Cl.
*G16H 50/50* (2018.01)
*G16H 10/60* (2018.01)
*G16H 50/30* (2018.01)

(52) U.S. Cl.
CPC ............. *G16H 50/50* (2018.01); *G16H 10/60* (2018.01); *G16H 50/30* (2018.01)

(58) Field of Classification Search
None
See application file for complete search history.

(56) References Cited

U.S. PATENT DOCUMENTS

2003/0065278 A1* 4/2003 Rubinstenn ............ A61B 5/444
600/587
2006/0089543 A1* 4/2006 Kim ....................... G16H 40/63
600/300
(Continued)

FOREIGN PATENT DOCUMENTS

JP  2000-067139 A     3/2000
JP  2007-95701 A  *  3/2007  ............. G06Q 10/04
(Continued)

OTHER PUBLICATIONS

Hossain et al., Use of Electronic Health Data for Disease Prediction: A Comprehensive Literature Review; IEEE/ACM Transactions on Computational Biology and Bioinformatics, vol. 18, No. 2, Mar./Apr. 2021.*

*Primary Examiner* — David J Stoltenberg
(74) *Attorney, Agent, or Firm* — Wolf, Greenfield & Sacks, P.C.

(57) ABSTRACT

Provided is a health support apparatus including an acquisition unit that acquires first data about a target user which is data about health and does not change or changes by less than a predetermined amount in a predetermined period and second data about the target user which is data about health and changes by more than or equal to the predetermined amount in the predetermined period, a determination unit that determines a future state parameter of the target user based on the first data and the second data, a generation unit that generates an image showing a future state of an appearance or an image showing a future state of an organ of the target user using the future state parameter of the target user determined in the determination unit, and an output unit that outputs the image generated in the generation unit.

11 Claims, 17 Drawing Sheets

(56) References Cited

U.S. PATENT DOCUMENTS

| | | | | |
|---|---|---|---|---|
| 2008/0088629 A1* | 4/2008 | Lorenz | ............ | G16H 15/00 |
| | | | | 600/300 |
| 2013/0174073 A1* | 7/2013 | Ash | ............ | G16H 50/30 |
| | | | | 715/771 |
| 2013/0325493 A1* | 12/2013 | Wong | ............ | G16Z 99/00 |
| | | | | 705/2 |
| 2015/0193588 A1* | 7/2015 | Nemoto | ............ | G16H 10/60 |
| | | | | 705/2 |
| 2018/0197099 A1* | 7/2018 | Liang | ............ | G06Q 30/0255 |
| 2019/0065687 A1* | 2/2019 | Mei | ............ | G06F 16/90335 |
| 2019/0380659 A1* | 12/2019 | Ohkuma | ............ | A61B 5/743 |
| 2020/0258637 A1* | 8/2020 | Jain | ............ | G16H 50/30 |
| 2020/0303047 A1* | 9/2020 | Bostic | ............ | G16H 50/50 |

FOREIGN PATENT DOCUMENTS

| | | | | | |
|---|---|---|---|---|---|
| JP | 2008-242963 A | | 10/2008 | | |
| JP | 2018-042812 A | | 3/2018 | | |
| KR | 2016-0043652 A | * | 4/2016 | ............ | A61B 5/021 |
| KR | 10-1940807 B1 | * | 9/2019 | ............ | A61B 5/021 |
| WO | WO 2017/191847 A1 | | 11/2017 | | |

* cited by examiner

| FUTURE STATE PARAMETER (FACE IMAGE) | PARAMETER RANGE |
|---|---|
| AMOUNT OF FACIAL WRINKLES | 0~100 |
| GLOSSINESS OF SKIN | 0~100 |
| COLOR OF SKIN | 0~100 |
| AMOUNT OF FLESH | 0~100 |
| AMOUNT OF SMILING | 0~100 |
| AMOUNT OF UNDER-EYE DARK CIRCLES | 0~100 |
| AMOUNT OF PERIORAL WRINKLES | 0~100 |
| ... | ... |

B

| FUTURE STATE PARAMETER (ORGAN) | PARAMETER RANGE |
|---|---|
| STATE OF BRAIN | 0~100 |
| STATE OF HEART | 0~100 |
| STATE OF LUNG | 0~100 |
| STATE OF LIVER | 0~100 |
| STATE OF KIDNEY | 0~100 |
| STATE OF BLOOD VESSELS | 0~100 |
| STATE OF NERVES | 0~100 |
| STATE OF EYES | 0~100 |
| ... | ... |

FIG. 5

| NAME OF FUTURE STATE PARAMETER | LONG-TERM FACTORS ||||
| --- | --- | --- | --- | --- |
| | BLOOD COLLECTION INFORMATION | GENOME INFORMATION | MEDICAL HISTORY | FAMILY MEDICAL HISTORY |
| AMOUNT OF FACIAL WRINKLES | BLOOD GLUCOSE LEVEL / PARAMETER VALUE<br>≦79 / +3<br>80–109 / 0<br>≧110 / +3<br><br>TOTAL CHOLESTEROL / PARAMETER VALUE<br>~119 / +4<br>120~220 / 0<br>221~ / +4 | SNP ABOUT BLOOD GLUCOSE (rs7903146) / PARAMETER VALUE<br>TT or TC / 0<br>CC / +2<br><br>SNP ABOUT BLOOD PRESSURE SNP (rs2681492) / PARAMETER VALUE<br>CC or TC / 0<br>TT / +4<br>... | MEDICAL HISTORY OF ASTHMA / PARAMETER VALUE<br>No / 0<br>Yes / +1<br><br>MEDICAL HISTORY OF HIGH-BLOOD PRESSURE / PARAMETER VALUE<br>No / 0<br>Yes / +1<br>... | FAMILY MEDICAL HISTORY OF MYOCARDIAL INFARCTION / PARAMETER VALUE<br>No / 0<br>Yes / +1<br><br>FAMILY MEDICAL HISTORY OF CEREBRAL INFARCTION / PARAMETER VALUE<br>No / 0<br>Yes / +1<br>... |
| GLOSSINESS OF SKIN | BLOOD GLUCOSE LEVEL / PARAMETER VALUE<br>≦79 / +2<br>80–109 / 0<br>≧110 / +2<br><br>TOTAL CHOLESTEROL / PARAMETER VALUE<br>~119 / +2<br>120~220 / 0<br>221~ / +3 | SNP ABOUT BLOOD GLUCOSE (rs7903146) / PARAMETER VALUE<br>TT or TC / 0<br>CC / +1<br><br>SNP ABOUT BLOOD PRESSURE SNP (rs2681492) / PARAMETER VALUE<br>CC or TC / 0<br>TT / +2<br>... | MEDICAL HISTORY OF ASTHMA / PARAMETER VALUE<br>No / 0<br>Yes / +1<br><br>MEDICAL HISTORY OF HIGH-BLOOD PRESSURE / PARAMETER VALUE<br>No / 0<br>Yes / +1<br>... | FAMILY MEDICAL HISTORY OF MYOCARDIAL INFARCTION / PARAMETER VALUE<br>No / 0<br>Yes / +1<br><br>FAMILY MEDICAL HISTORY OF CEREBRAL INFARCTION / PARAMETER VALUE<br>No / 0<br>Yes / +1<br>... |
| ... | | | | |

FIG. 6

| NAME OF FUTURE STATE PARAMETER | LONG-TERM FACTORS ||||
|---|---|---|---|---|
| | BLOOD COLLECTION INFORMATION | GENOME INFORMATION | MEDICAL HISTORY | FAMILY MEDICAL HISTORY |
| STATE OF BRAIN | BLOOD GLUCOSE LEVEL / PARAMETER VALUE: ≦79 → +1; 80–109 → 0; ≧110 → +1<br>TOTAL CHOLE-STEROL / PARAMETER VALUE: ~119 → +1; 120~220 → 0; 221~ → +1<br>... | SNP ABOUT BLOOD GLUCOSE (rs7903146) / PARAMETER VALUE: TT or TC → 0; CC → +1<br>SNP ABOUT BLOOD PRESSURE SNP (rs2681492) / PARAMETER VALUE: CC or TC → 0; TT → +1<br>... | MEDICAL HISTORY OF ASTHMA / PARAMETER VALUE: No → 0; Yes → 0<br>MEDICAL HISTORY OF HIGH-BLOOD PRESSURE / PARAMETER VALUE: No → 0; Yes → +1<br>... | FAMILY MEDICAL HISTORY OF MYOCARDIAL INFARCTION / PARAMETER VALUE: No → 0; Yes → 0<br>FAMILY MEDICAL HISTORY OF CEREBRAL INFARCTION / PARAMETER VALUE: No → 0; Yes → 0<br>... |
| BLOOD GLUCOSE LEVEL | BLOOD GLUCOSE LEVEL / PARAMETER VALUE: ≦79 → +1; 80–109 → 0; ≧110 → +1<br>TOTAL CHOLE-STEROL / PARAMETER VALUE: ~119 → +1; 120~220 → 0; 221~ → +1<br>... | SNP ABOUT BLOOD GLUCOSE (rs7903146) / PARAMETER VALUE: TT or TC → 0; CC → +1<br>SNP ABOUT BLOOD PRESSURE SNP (rs2681492) / PARAMETER VALUE: CC or TC → 0; TT → +1<br>... | MEDICAL HISTORY OF ASTHMA / PARAMETER VALUE: No → 0; Yes → +1<br>MEDICAL HISTORY OF HIGH-BLOOD PRESSURE / PARAMETER VALUE: No → 0; Yes → +1<br>... | FAMILY MEDICAL HISTORY OF MYOCARDIAL INFARCTION / PARAMETER VALUE: No → 0; Yes → +1<br>FAMILY MEDICAL HISTORY OF CEREBRAL INFARCTION / PARAMETER VALUE: No → 0; Yes → 0<br>... |
| ... | | | | |

FIG. 7

| NAME OF FUTURE STATE PARAMETER | SHORT-TERM FACTORS |||  |
|---|---|---|---|---|
| | AMOUNT OF EXERCISE | SLEEP HABIT | SMOKING HABIT | ... |
| AMOUNT OF FACIAL WRINKLES | THE NUMBER OF STEPS / PARAMETER VALUE: ≤8000 / 0, ≥8001 / -1, ≥12001 / -2<br><br>JOGGING / PARAMETER VALUE: ≤20 min / 0, ≥21 min / -1, ≥41 min / -2 | SLEEP DURATION / PARAMETER VALUE: <7h / +1, ≥7h / 0 | AMOUNT OF SMOKING / PARAMETER VALUE: No / 0, ≥1 / -1 | ... |
| GLOSSINESS OF SKIN | THE NUMBER OF STEPS / PARAMETER VALUE: ≤8000 / 0, ≥8001 / -1, ≥12001 / -2<br><br>JOGGING / PARAMETER VALUE: ≤20 min / 0, ≥21 min / -1, ≥41 min / -2 | SLEEP DURATION / PARAMETER VALUE: <7h / +1, ≥7h / 0 | AMOUNT OF SMOKING / PARAMETER VALUE: No / 0, ≥1 / -1 | ... |
| ... | | | | ... |

FIG. 8

| NAME OF FUTURE STATE PARAMETER | SHORT-TERM FACTORS ||||
|---|---|---|---|---|
| | AMOUNT OF EXERCISE | SLEEP HABIT | SMOKING HABIT | ... |
| STATE OF BRAIN | THE NUMBER OF STEPS / PARAMETER VALUE: ≤8000 / 0, ≥8001 / −1, ≥12001 / −2 <br><br> JOGGING / PARAMETER VALUE: ≤20 min / 0, ≥21 min / −1, ≥41 min / −2 | SLEEP DURATION / PARAMETER VALUE: <7h / +1, ≥7h / 0 | AMOUNT OF SMOKING / PARAMETER VALUE: No / 0, ≥1 / −1 | ... |
| STATE OF HEART | THE NUMBER OF STEPS / PARAMETER VALUE: ≤8000 / 0, ≥8001 / −1, ≥12001 / −2 <br><br> JOGGING / PARAMETER VALUE: ≤20 min / 0, ≥21 min / −1, ≥41 min / −2 | SLEEP DURATION / PARAMETER VALUE: <7h / +1, ≥7h / 0 | AMOUNT OF SMOKING / PARAMETER VALUE: No / 0, ≥1 / −1 | ... |
| ... | | | | |

FIG.9

LONG-TERM FACTORS

| BLOOD GLUCOSE LEVEL | AMOUNT OF FACIAL WRINKLES |
|---|---|
| ≤ 78, ≥ 109 | +3 |
| 79-109 | 0 |

| TOTAL CHOLESTEROL | AMOUNT OF FACIAL WRINKLES |
|---|---|
| ≤ 119 | +4 |
| 120-220 | 0 |
| ≥ 221 | +4 |

...

SHORT-TERM FACTORS

| THE NUMBER OF STEPS | AMOUNT OF FACIAL WRINKLES |
|---|---|
| ≤ 8000 | +1 |
| ≥ 8001 | 0 |
| ≥ 12001 | 0 |

| SLEEP DURATION | AMOUNT OF FACIAL WRINKLES |
|---|---|
| < 7h | 0 |
| ≥ 7h | +1 |

...

T10

| AMOUNT OF FACIAL WRINKLES | LONG-TERM FACTORS (TOTAL) | | | | | | |
|---|---|---|---|---|---|---|---|
| | | 0 | 1 | 1 | 1 | 2 | 2 | ... | 9 |
| SHORT-TERM FACTORS (TOTAL) | 0 | 100 | ... | ... | ... | ... | ... | ... | ... |
| | 1 | 70 | | | | | | |
| | 2 | 70 | | | | | | |
| | 3 | 71 | | | | | | |
| | ... | 71 | | | | | | |
| | 100 | ... | | | | | | |
| | | 100 | | | | | | |

FIG. 10
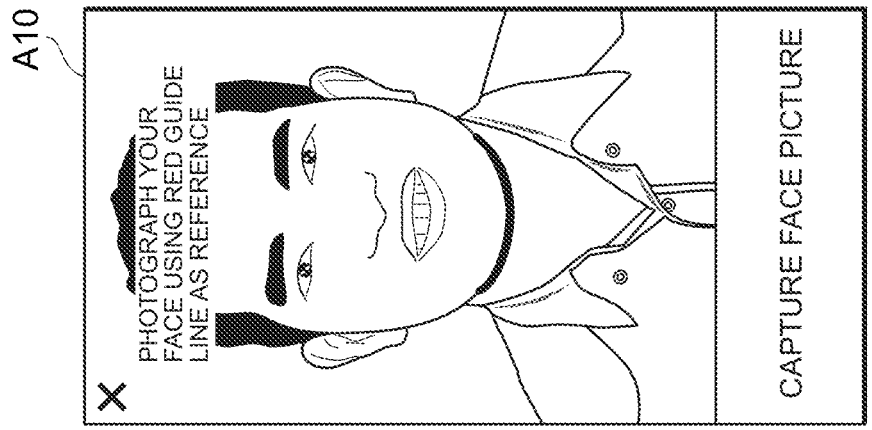
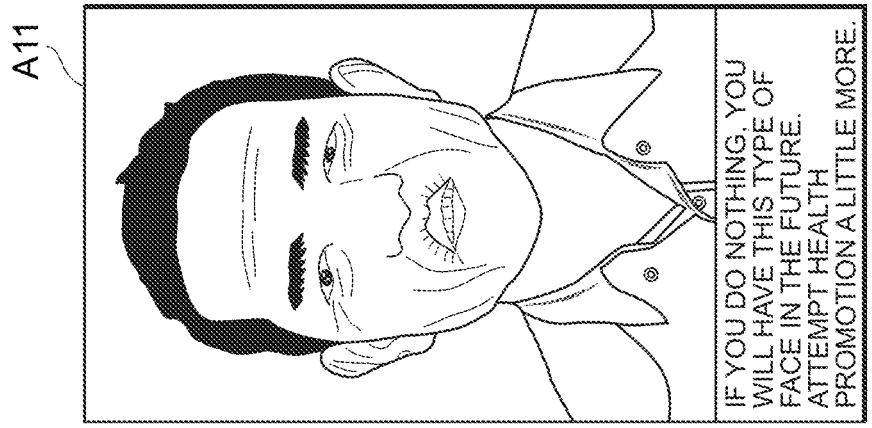
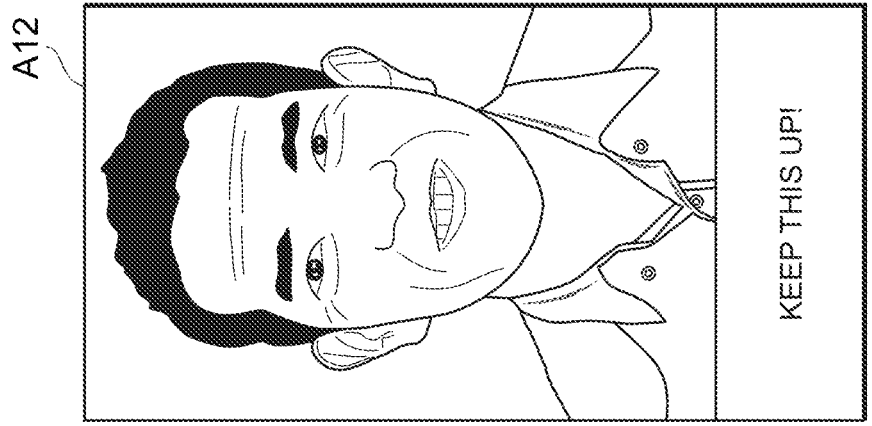

FIG. 11
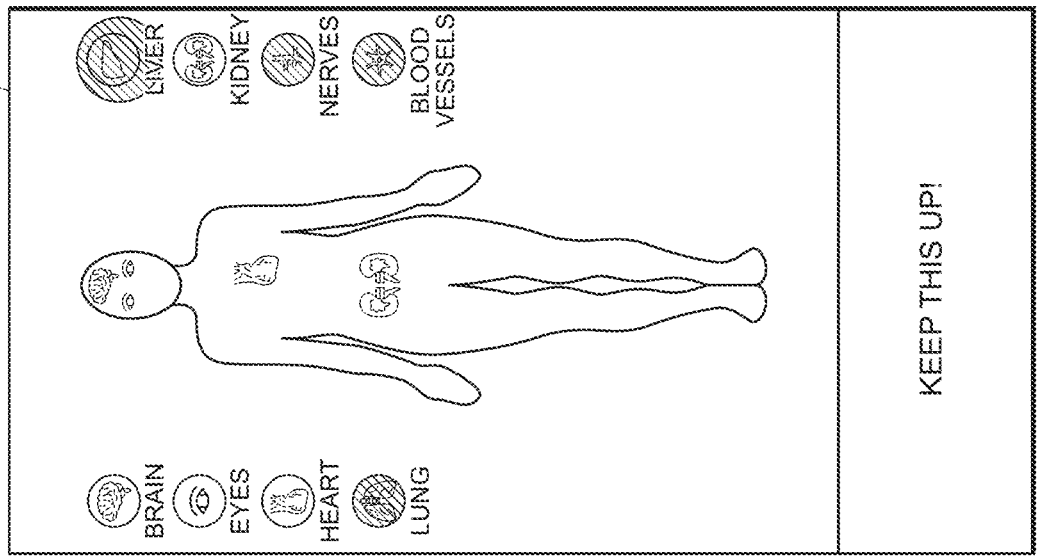
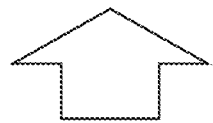
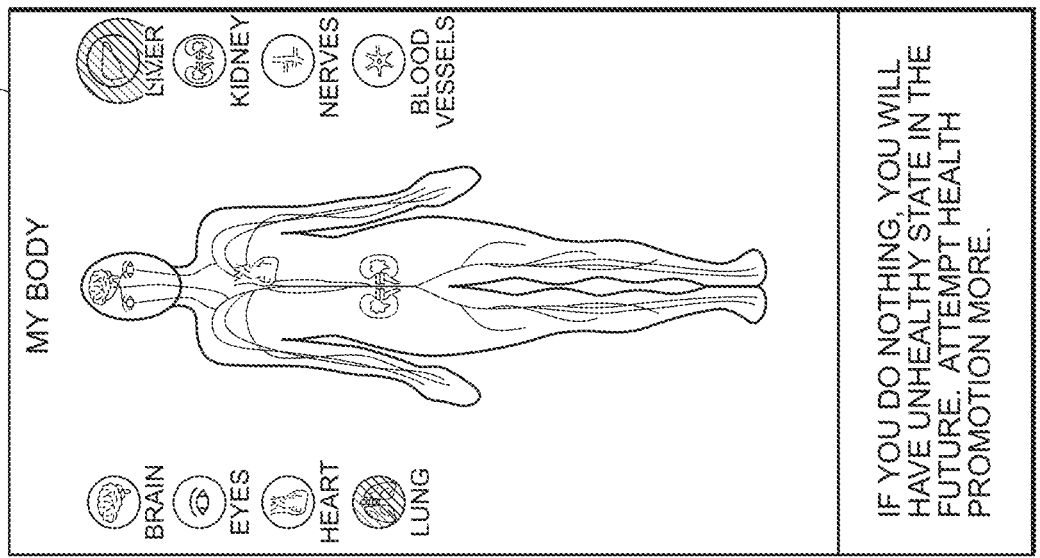

FIG.13

| NAME OF PARAMETER | PARAMETER RANGE |
|---|---|
| ACTIVITY SCORE | 0~100 |
| SLEEP SCORE | 0~100 |
| SMOKING SCORE | 0~100 |
| DRINKING SCORE | 0~100 |
| STRESS SCORE | 0~100 |
| NUTRITION SCORE | 0~100 |
| ... | ... |

FIG. 14
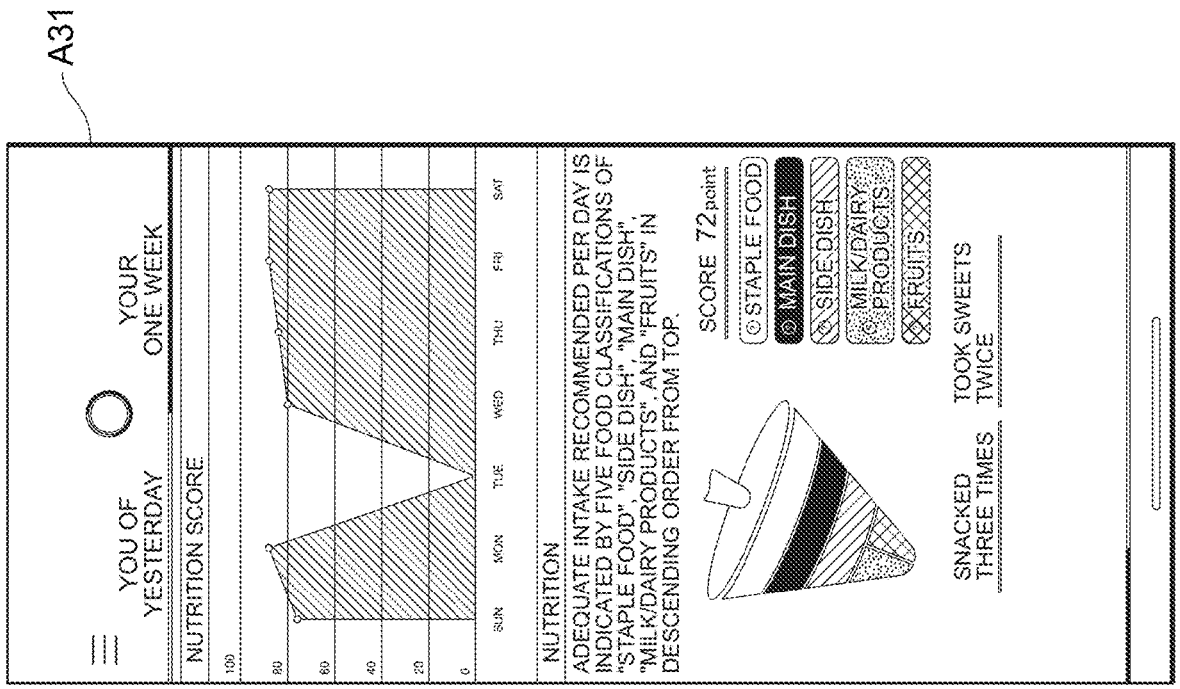
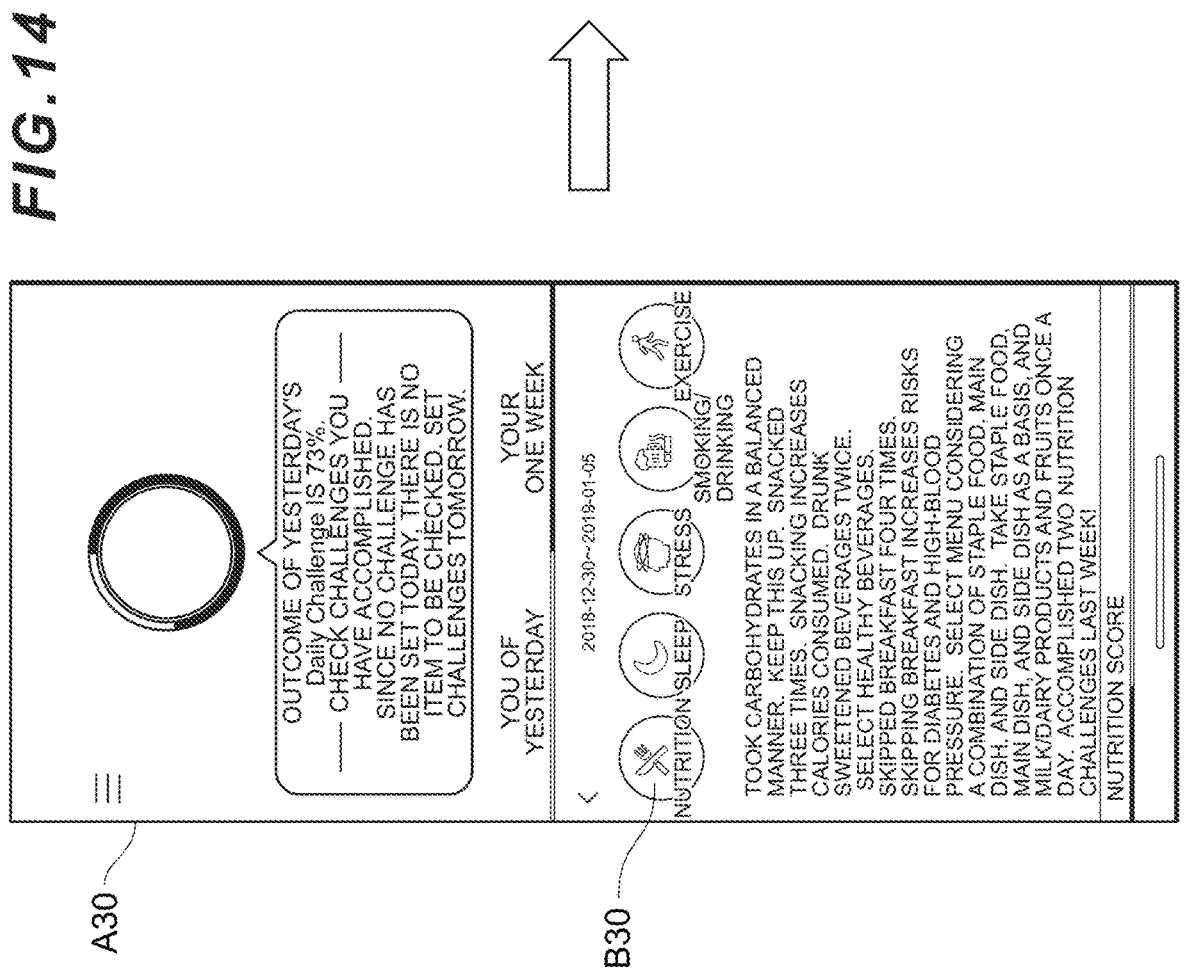

HEALTH SUPPORT APPARATUS, HEALTH SUPPORT METHOD, AND PROGRAM

CROSS-REFERENCE TO RELATED APPLICATIONS

This application is a national stage filing under 35 U.S.C. § 371 of International Application No. PCT/JP2021/025113, filed Jul. 2, 2021, which claims priority to Japanese Application No. 2020-115700, filed Jul. 3, 2020, each of which is herein incorporated by reference in its entirety.

TECHNICAL FIELD

The present disclosure relates to a health support apparatus, a health support method, and a program.

BACKGROUND ART

There is known a health management system which based on a captured face image and health sickness information which is a physician's diagnostic result, displays a predicated face image of augmented reality corresponding to the health sickness information.

CITATION LIST

Patent Literature

Patent Literature 1: Japanese Patent Laid-Open No. 2018-42812

SUMMARY OF INVENTION

Technical Problem

In the current aging society, it is believed important for people to perform health management for themselves. However, an information terminal apparatus described in Patent Literature 1 reflects states of a disease and the like based on a physician's diagnostic result to a face image, which is considered less likely to result in a change in mindset for a user to proactively try to perform health management.

The present disclosure therefore has an object to provide a health support apparatus, a health support method, and a program that can prompt a user to change his/her mindset about performing health management. The present disclosure also has an object to provide a health support apparatus, a health support method, and a program that enable a specific health guidance to be performed more effectively. The present disclosure further has an object to provide a health support apparatus, a health support method, and program that can be used for treatment of a patient having contracted a metabolic syndrome or the like.

Solution to Problem

A health support apparatus according to an aspect of the present disclosure includes an acquisition unit that acquires first data about a target user which is data about health and does not change or changes by less than a predetermined amount in a predetermined period and second data about the target user which is data about health and changes by more than or equal to the predetermined amount in the predetermined period, a determination unit that determines a future state parameter of the target user based on the first data and the second data, a generation unit that generates an image showing a future state of an appearance or an image showing a future state of an organ of the target user using the future state parameter of the target user determined in the determination unit, and an output unit that outputs the image generated in the generation unit.

A health support apparatus according to another aspect of the present disclosure includes an acquisition unit that acquires first data about a target user which is data about health and does not change or changes by less than a predetermined amount in a predetermined period and second data about the target user which is data about health and changes by more than or equal to the predetermined amount in the predetermined period, a determination unit that determines a disease prediction score based on the first data, and determines a current state parameter based on the second data, a generation unit that generates an advice about health of the target user based on a correlation between the disease prediction score and the second data or the current state parameter, and an output unit that outputs the advice generated in the generation unit.

Advantageous Effects of Invention

According to the present disclosure, a health support apparatus, a health support method, and a program that can prompt a user to change his/her mindset about performing health management can be provided. In addition, according to the present disclosure, a specific health guidance can be performed more effectively. Further, according to the present disclosure, treatment of a patient having contracted a metabolic syndrome or the like can be performed more efficiently and effectively.

BRIEF DESCRIPTION OF DRAWINGS

FIG. 3 is a flowchart showing an example of (first) processing steps to be performed when the health support apparatus displays a future image of a user and the like.

FIG. 4 is a diagram showing an example of future state parameters.

FIG. 5 is a diagram showing an example of future information (long-term factors).

FIG. 6 is a diagram showing an example of future information (long-term factors).

FIG. 7 is a diagram showing an example of future information (short-term factors).

FIG. 8 is a diagram showing an example of future information (short-term factors).

FIG. 9 is a diagram showing an example of definition information to be utilized for determining a future state parameter.

FIG. 10 is a diagram showing a display example of appearance future images.

FIG. 11 is a diagram showing a display example of organ future images.

FIG. 12 is a flowchart showing an example of (second) processing steps to be performed when the health support apparatus displays a future image of a user and the like.

FIG. 13 is a diagram showing an example of current state parameters.

FIG. 14 is a diagram showing an example of a screen that displays advices based on current state parameters.

FIG. 16 is a flowchart showing an example of (third) processing steps to be performed when the health support apparatus displays a future image of a user and the like.

DESCRIPTION OF EMBODIMENT

Figure 1:
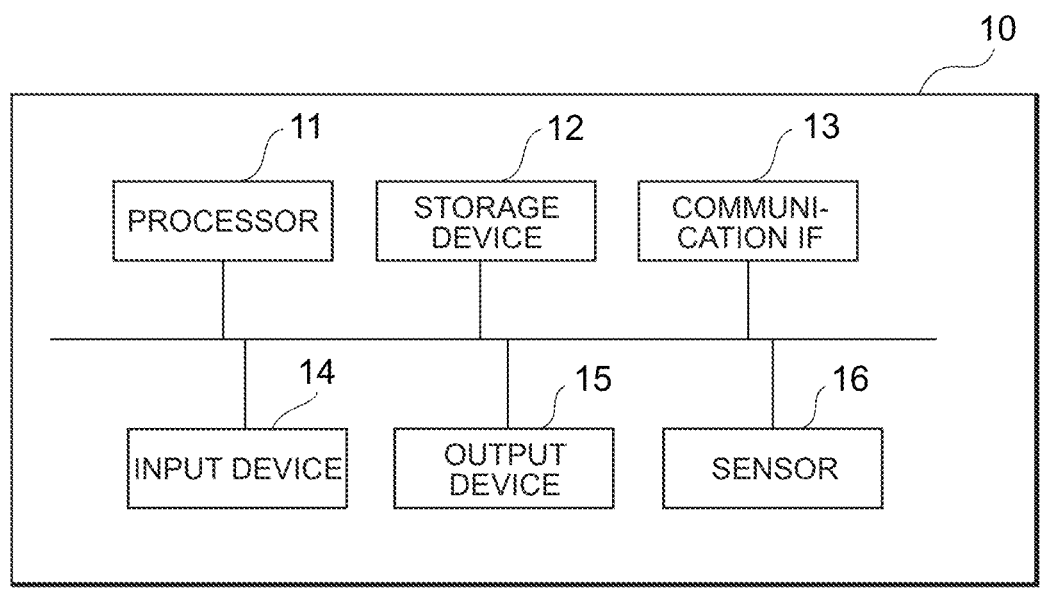
FIG. 1 is a diagram showing a hardware configuration example of a health support apparatus.

An embodiment of the present disclosure will be described with reference to the appended drawings. Note that components with the same reference character in the respective drawings have the same or similar configuration.

<System Configuration>

A health support apparatus 10 is an apparatus that based on data about health such as biological information and lifestyle habit information on a target user (hereinafter referred to as a "user"), determines a future change in appearance of the user, the likelihood of future occurrence of an abnormality in a body organ, and the like for presentation to the user.

The present embodiment defines data about health such as biological information and lifestyle habit information, which affects a change in appearance of the user and a future presence/absence of an abnormality in a body organ, in a manner divided into long-term factors and short-term factors. A long-term factor is unchanging data, or data that changes but changes by a small amount. In other words, the long-term factor can be defined as "unchanging data or data that changes by less than a predetermined amount in a predetermined period". The predetermined period is, for example, a month or the like, but is not limited to this. The predetermined amount may be a change in a predetermined period within ±20% or the like, for example, but is not limited to this.

A short-term factor is data that changes by an amount larger than the amount of change in a long-term factor in a predetermined period. In other words, the short-term factor can be defined as "data that changes by more than or equal to a predetermined amount in a predetermined period".

Specific examples of the long-term factor include blood collection information, genome information, protein information, medical history, gender, age, BMI, family medical history, and the like. These long-term factors may be classified in more detail. For example, the blood collection information may be classified further into blood glucose level, total cholesterol, and the like. The long-term factor may also include items such as total income, job position, and work information, which are not biological information but may indirectly affect the health of the user.

Specific examples of the short-term factor include exercise habit, sleep habit, degree of stress, nutrition intake habit, amount of alcohol intake, smoking habit, and the like. These short-term factors may be classified in more detail. For example, the exercise habit may be classified into the number of steps taken in a predetermined period (such as a day or a week), a duration of jogging in a predetermined period (such as a day or a week), and the like. The short-term factor may also include items such as weather information and local information of one day, which are not biological information but may indirectly affect the health of the user.

The health support apparatus 10 acquires, at the start of utilization, long-term factors and short-term factors of the user, and based on the acquired long-term factors and short-term factors, generates and displays an image showing a future state of the appearance of the user (hereinafter referred to as an "appearance future image") or an image showing a future state of organs (hereinafter referred to as an "organ future image"). In the following description, an appearance future image and an organ future image will be collectively referred to as a "future image". By making the user visually recognize a future change in appearance and the likelihood of occurrence of an abnormality in an organ, the user himself/herself can be made aware of the importance of health management and can be prompted to change his/her mindset about performing health management.

The health support apparatus 10 also acquires updated short-term factors repeatedly (such as daily or weekly, for example), and based on the long-term factors already acquired and the updated short-term factors, updates the appearance future image or the organ future image of the user. When a short-term factor is improved by user's life improvement or the like, data about the appearance future image or the organ future image of the user also changes to a better state. The change of the image data to a better state enables the user to keep motivation to continually carry on life improvement and health management.

The health support apparatus 10 also generates and displays an advice about health of the user using a disease prediction score indicating the likelihood of future occurrence of a disease calculated based on the long-term factors, and parameters for evaluating a current health state of the user (hereinafter referred to as "current state parameters") determined from the short-term factors. The health support apparatus 10 can also generate an advice about health of the user using information about whether or not the user has contracted a specific or a target disease in addition to the disease prediction score and the current state parameters.

Any information processing apparatus such as a smartphone, a tablet terminal, a portable phone, a personal computer (PC), a notebook PC, a server, a cloud server, a personal digital assistant (PDA), or a home-use game console can be used as the health support apparatus 10. Alternatively, the health support apparatus 10 may be configured using a plurality of information processing apparatuses such as a smartphone and a server, for example. In this case, the server may be configured from one or more physical servers or the like, may be configured using a virtual server operating on a hypervisor, or may be configured using a cloud server.

FIG. 1 is a diagram showing a hardware configuration example of the health support apparatus 10. The health support apparatus 10 has a processor 11 such as a CPU (central processing unit) or a GPU (graphical processing unit), a storage device 12 such as a memory, a HDD (hard disk drive), and/or a SSD (solid state drive), a communication IF (interface) 13 that performs wired or wireless communication, an input device 14 that accepts an input operation, and an output device 15 that outputs information. Examples of the input device 14 include a keyboard, a touch panel, a mouse, and/or a microphone, and the like. Examples of the output device 15 include a display, and/or a speaker, and the like.

Figure 2:
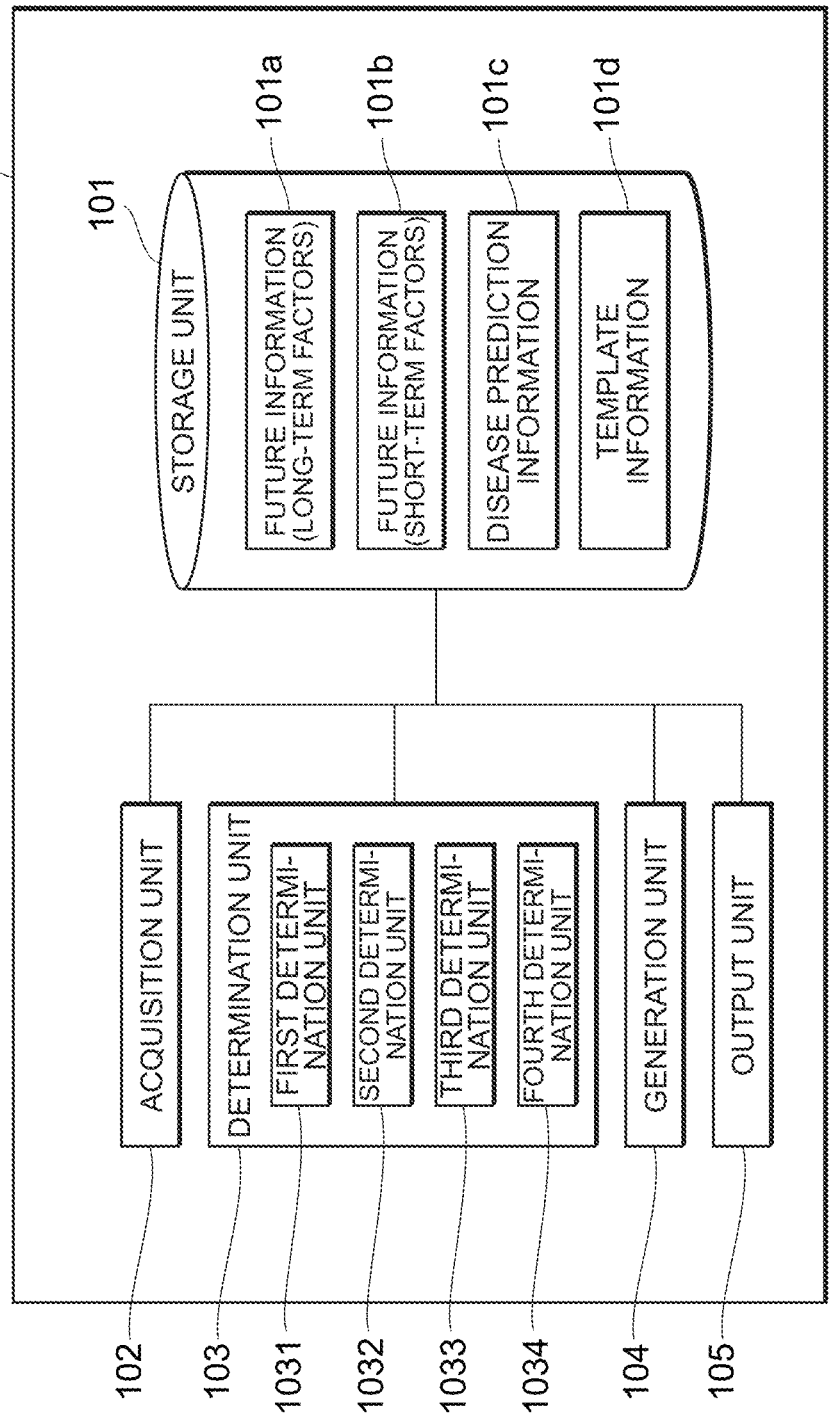
FIG. 2 is a diagram showing a functional block configuration example of the health support apparatus.

FIG. 2 is a diagram showing a functional block configuration example of the health support apparatus 10. The health support apparatus 10 includes a storage unit 101, an acquisition unit 102, a determination unit 103, a generation unit 104, and an output unit 105. The storage unit 101 can be implemented by using the storage device 12 included in the health support apparatus 10. The acquisition unit 102, the determination unit 103, the generation unit 104, and the output unit 105 can be implemented by the processor 11 of the health support apparatus 10 executing a program stored in the storage device 12. The program can be stored in a storage medium. The storage medium that stores the program may be a computer readable non-transitory storage medium (non-transitory computer readable medium). The non-transitory storage medium is not particularly limited, but may be a storage medium such as a USB memory or a CD-ROM, for example. Note that FIG. 2 is merely an example of a functional block configuration example of the health support apparatus 10, and it is not intended that all the functional blocks shown in FIG. 2 are essential components. For example, the health support apparatus 10 can also be configured without including the storage unit 101 and the generation unit 104.

Figure 15:
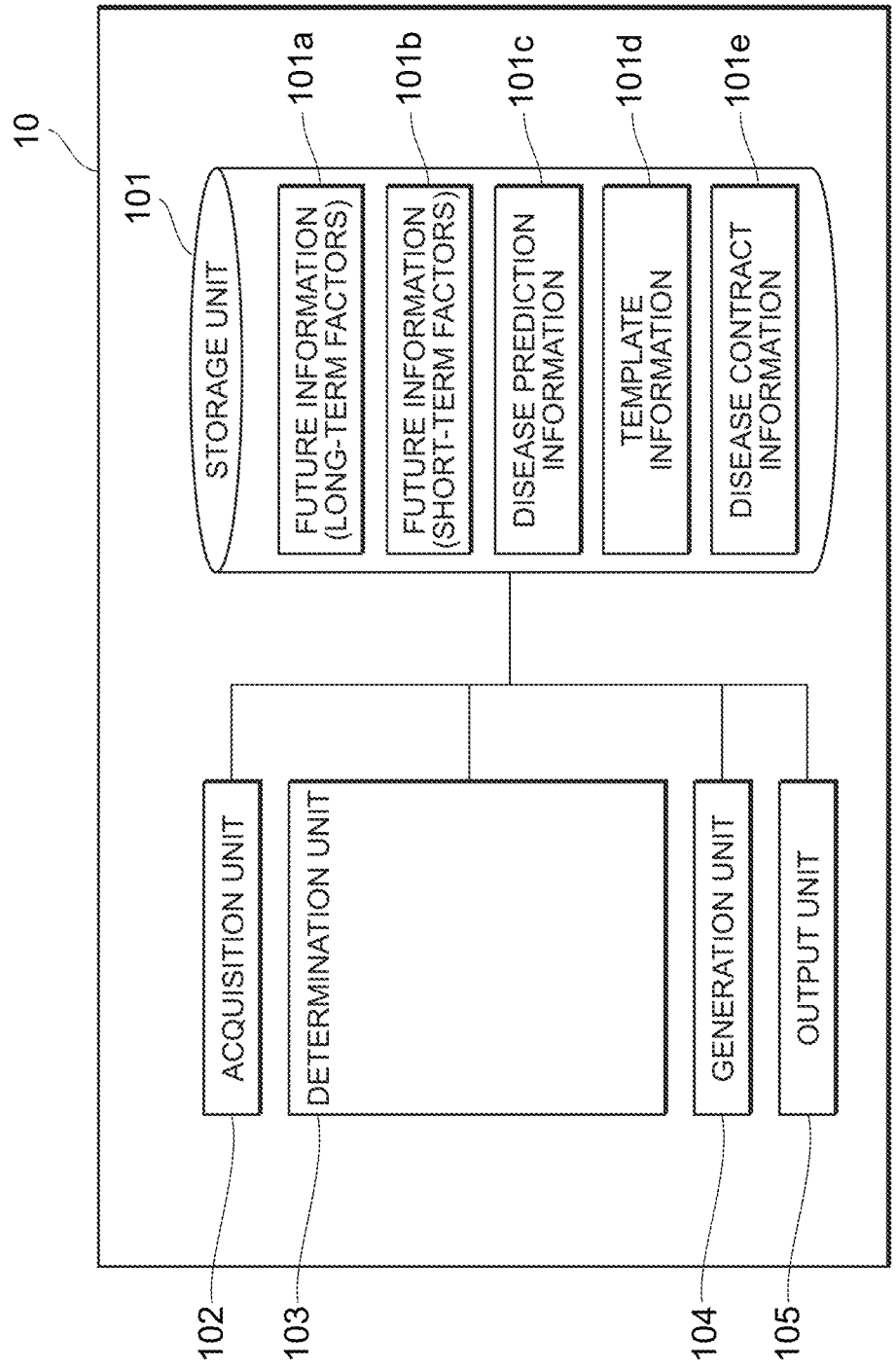
FIG. 15 is a diagram showing another functional block configuration example of the health support apparatus.

The storage unit 101 stores future information (long-term factors) 101*a* (first future information), future information (short-term factors) 101*b* (second future information), disease prediction information 101*c*, and advice information 101*d* (template information). The storage unit 101 may also store disease contract information 101*e* in addition to the above-described respective types of information in accordance with the content of processing steps which will be described later (FIG. 15).

The future information (long-term factors) 101*a* is information indicating a correspondence relationship between a long-term factor (first data) and the degree of change in a parameter (hereinafter referred to as a "future state parameter") for generating an appearance future image or an organ future image. The future information (long-term factors) 101*a* may be information indicating a correspondence relationship between each of a plurality of types of long-term factors and the degree of change in each of a plurality of types of future state parameters.

The future information (short-term factors) 101*b* is information indicating a correspondence relationship between a short-term factor (second data) and the degree of change in a future state parameter. The future information (short-term factors) 101*b* may be information indicating a correspondence relationship between each of a plurality of types of short-term factors and the degree of change in each of a plurality of types of future state parameters.

The disease prediction information 101*c* is information to be used for determining a disease prediction score indicating the likelihood of future occurrence of a disease from a plurality of types of long-term factors.

The advice information 101*d* is information for generating an advice about health of the user. The advice information 101*d* may be a text string defined in advance in a fixed manner in accordance with a value of a future state parameter, for example. Alternatively, the advice information 101*d* may be a text string having a blank for a numerical value to be inputted and which enables an advice about health to be generated by embedding a numerical value (such as a numerical value of an improved short-term factor, for example) calculated from long-term factors and/or short-term factors into the blank portion.

The acquisition unit 102 acquires long-term factors and short-term factors about the user. The acquisition unit also acquires a plurality of types of long-term factors and a plurality of types of short-term factors about the user. The acquisition unit 102 repeatedly acquires an "updated short-term factor" about the user. The acquisition unit 102 can also acquire information about whether or not the user who utilizes the health support apparatus 10 has contracted a specific or a target disease.

The determination unit 103 determines a future state parameter of the user based on the long-term factors and the short-term factors about the user. The determination unit 103 includes a first determination unit 1031, a second determination unit 1032, a third determination unit 1033, and a fourth determination unit 1034. Alternatively, the determination unit 103 may not include the first determination unit 1031, the second determination unit 1032, the third determination unit 1033, and the fourth determination unit 1034 in accordance with the content of the processing steps which will be described later (FIG. 15). Hereinafter, a functional block configuration example of the health support apparatus 10 will be described first using FIG. 2.

The first determination unit 1031 determines the degree of change in future state parameter in accordance with the long-term factors about the user with reference to the future information (long-term factors) 101*a*. Note that the first determination unit 1031 may determine the degree of change in future state parameter in accordance with a plurality of types of long-term factors about the user for each type with reference to the future information (long-term factors) 101*a*. Alternatively, the first determination unit 1031 may determine the degree of change in future state parameter by utilizing a learned model that outputs the degree of change in future state parameter by inputting values of the long-term factors.

The second determination unit 1032 determines the degree of change in future state parameter in accordance with the short-term factors about the user with reference to the future information (short-term factors) 101*b*. Note that the second determination unit 1032 may determine the degree of change in future state parameter in accordance with a plurality of types of short-term factors about the user for each type with reference to the future information (short-term factors) 101*b*. Alternatively, the second determination unit 1032 may determine the degree of change in future state parameter by utilizing a learned model that outputs the degree of change in future state parameter by inputting values of the short-term factors.

Alternatively, the second determination unit 1032 may determine an "updated degree of change in future state parameter" in accordance with an "updated short-term factor" about the user with reference to the future information (short-term factors) 101*b*. Alternatively, the second determination unit 1032 may determine the "updated degree of change in future state parameter" by inputting the "updated short-term factor" to the learned model that outputs the degree of change in future state parameter by inputting values of the short-term factors.

The third determination unit 1033 determines a future state parameter of the user based on the degree of change in future state parameter determined in the first determination unit 1031 and the degree of change in future state parameter determined in the second determination unit 1032. Alternatively, the third determination unit 1033 may determine a future state parameter of the user for each type based on the degree of change in each type of future state parameters determined in the first determination unit 1031 and the degree of change in each type of future state parameters determined in the second determination unit 1032.

Alternatively, the third determination unit 1033 may determine an "updated future state parameter" of the user based on the degree of change in future state parameter determined in the first determination unit 1031 and the "updated degree of change in future state parameter" determined in the second determination unit 1032.

The fourth determination unit 1034 determines a disease prediction score of the user in accordance with the long-term factors about the user using the disease prediction information 101*c*.

The generation unit 104 generates an image showing a future state of the appearance of the user or an image showing a future state of the organs using future state parameters of the user determined in the third determination unit 1033.

Alternatively, the generation unit 104 may generate an image showing a future state of the appearance or an image showing a future state of the organs of the user using future state parameters of the user determined for each type in the third determination unit 1033. The generation unit 104 also updates the appearance future image or the organ future image using "updated future state parameters" of the user determined in the third determination unit 1033. Note that updating a future image is synonymous with generating an updated future image.

The generation unit 104 may also generate an advice about health of the user by accessing the advice information 101d and acquiring text strings corresponding to future state parameters. The generation unit 104 may also generate an advice about health of the user by embedding values included in long-term factors of the user, values included in short-term factors of the user, or values calculated based on the long-term factors or the short-term factors of the user into the acquired text strings.

The output unit 105 outputs the image generated in the generation unit 104. The output unit 105 may also output the disease prediction scores of the user determined in the fourth determination unit 1034. The output unit 105 may also output the advice about health to be presented to the user generated in the generation unit 104.

<(First) Processing Steps>

Figure 3:
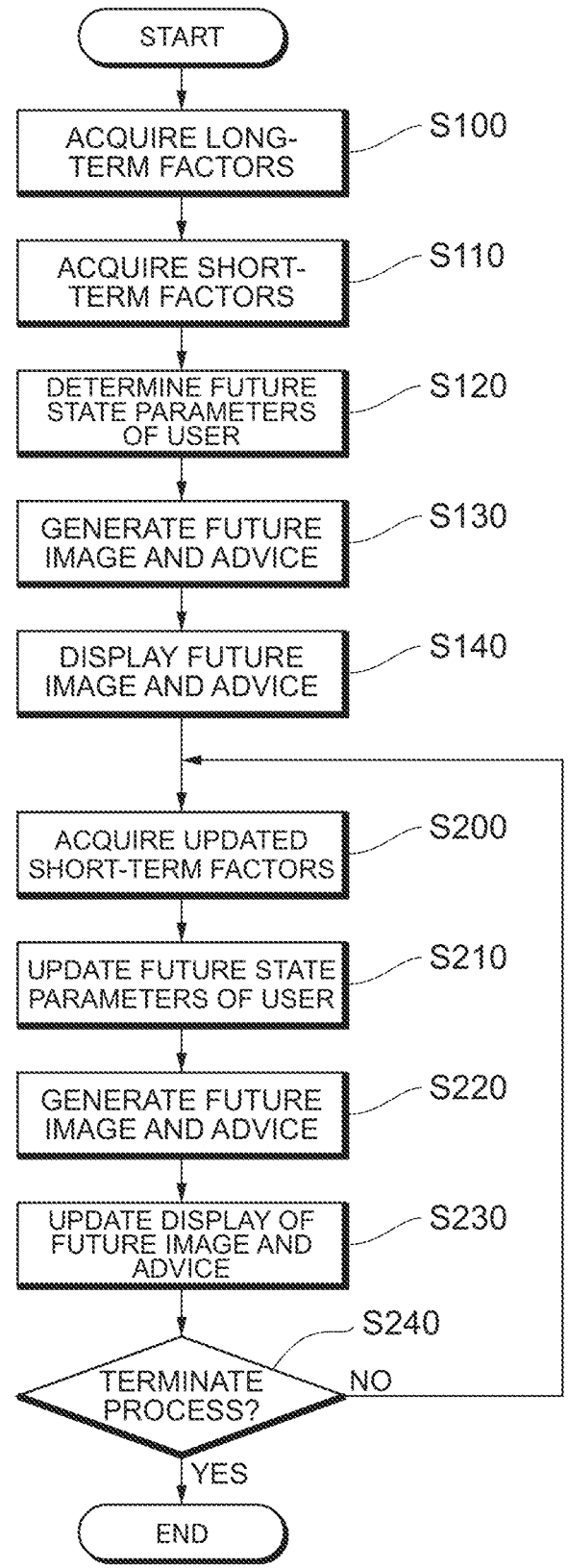

Subsequently, processing steps to be performed by the health support apparatus 10 will be specifically described. FIG. 3 is a flowchart showing an example of (first) processing steps to be performed when the health support apparatus 10 displays a future image of the user and the like. Processing steps from step S100 to step S140 correspond to processing to be performed at the start of utilization of the health support apparatus 10. Processing steps from step S200 to step S240 correspond to processing steps to be performed when the user continually performs health management and short-term factors are updated so that a future image and the like are updated.

For example, the processing steps from step S200 to step S240 may be repeatedly executed in a predetermined cycle (such as a day or a week, for example) while the user continually performs health management. The processing steps from step S100 to step S140 are not performed limitedly at the start of utilization, but may also be repeatedly executed in a cycle (such as every year, for example) longer than the cycle of the processing steps from step S00 to step S240 in accordance with changes in long-term factors.

In step S100, the acquisition unit 102 acquires values of long-term factors about the user. For example, an input screen for inputting the item names of long-term factors and values of the respective items may be displayed on a screen of the health support apparatus 10, and the acquisition unit 102 may acquire the values inputted on the input screen as values of the long-term factors. Alternatively, with respect to data acquired by an examination in a medical institution, such as a result of blood examination and genome information, the health support apparatus 10 may acquire values of long-term factors of the user from a system of the medical institution or the like.

In step S110, the acquisition unit 102 acquires values of short-term factors about the user. For example, an input screen for inputting the item names of short-term factors and values of the respective items may be displayed on the screen of the health support apparatus 10, and the acquisition unit 102 may acquire the values inputted on the input screen as the values of the short-term factors.

In step S120, the determination unit 103 determines future state parameters of the user from the long-term factors and the short-term factors of the user. A specific example when determining the future state parameters will now be described.

FIG. 4 is a diagram showing an example of future state parameters. The future state parameters include a plurality of types of future state parameters (face image) to be used for generating an appearance future image as indicated by A in FIG. 4 and a plurality of types of future state parameters (organ) indicated by B in FIG. 4 to be used for generating an organ future image.

Although the appearance future image may be any image, a face image is utilized as the appearance future image in the present embodiment. A future state parameter (face image) is expressed within a range of 0 to 100, for example, and a larger value indicates that the appearance deteriorates. For example, the "amount of facial wrinkles" represents the amount of wrinkles in the face image, and a larger value means a larger amount of wrinkles. The "glossiness of skin" indicates glossiness of skin in the face image, and a larger value means that the skin is less glossy. The "color of skin" indicates the color of skin in the face image, and a larger value means a darker color. The "amount of flesh" indicates flesh in the face image, and a larger value means that flesh is reduced (the user looks more haggard). The "amount of smiling" indicates whether or not the face image is smiling, and a larger value means less smiling. The "amount of under-eye dark circles" indicates the size of under-eye dark circles in the face image, and a larger value means larger dark circles. The "amount of perioral wrinkles" indicates the amount of perioral wrinkles in the face image, and a larger value means a larger amount of wrinkles.

Although the organ future image may be any image, an icon of organ is utilized as an organ future image in the present embodiment. A future state parameter (organ) is expressed within the range of 0 to 100, for example, and a larger value indicates a higher risk of occurrence of an abnormality. At B in FIG. 4, for example, the "state of brain" represents the degree of risk of future occurrence of some abnormality or disorder in the brain, and the "state of heart" represents the degree of risk of future occurrence of some abnormality or disorder in the heart.

FIG. 5 and FIG. 6 are diagrams each showing an example of the future information (long-term factors) 101a. In more detail, FIG. 5 is information in which a long-term factor and a degree of change (hereinafter referred to as an "amount of change") in future state parameter (face image) are associated, and FIG. 6 is information in which a long-term factor and the amount of change in future state parameter (organ) are associated. FIG. 7 and FIG. 8 are diagrams each showing an example of the future information (short-term factors) 101b. In more detail, FIG. 7 is information in which a short-term factor and the amount of change in future state parameter (face image) are associated, and FIG. 8 is information in which a short-term factor and the amount of change in future state parameter (organ) are associated.

As shown in FIG. 5, in a case where the "blood glucose level" in blood collection information is less than or equal to 79, in a case of 80 to 109, and in a case of more than or equal to 110, the amount of change in the "amount of facial wrinkles" is +3, 0, and +3, respectively. This means that in the case where the "blood glucose level" is less than or equal to 79 or more than or equal to 110, three is added to the value of the "amount of facial wrinkles", and in the case where the "blood glucose level" is 80 to 109, nothing is added to the value of the "amount of facial wrinkles".

Similarly, in a case where the "total cholesterol" is less than or equal to 119, in a case of 120 to 220, and in a case of more than or equal to 221, the value to be added to the "amount of facial wrinkles" is +4, 0, and +4, respectively. Similarly, in a case where "SNP about blood glucose" in genome information is TT or TC, the value to be added to the "amount of facial wrinkles" is 0, and in a case of CC, the value to be added to the "amount of facial wrinkles" is +2.

First, the determination unit 103 determines the amount of change in future state parameter corresponding to a long-term factor of the user with reference to the future information (long-term factors) 101a.

For example, the determination unit 103 adds the amounts of change corresponding to the long-term factors of the user for each type of future state parameters with reference to the future information (long-term factors) 101a shown in FIG. 5. For example, in a case of a user whose blood glucose level is 100, total cholesterol is 230, SNP about blood glucose is TT, SNP about blood pressure is TC and who has a medical history of asthma, does not have a medical history of high-blood pressure, does not have a family medical history of myocardial infarction, and has a family medical history of cerebral infarction, a total amount of change in the "amount of facial wrinkles" is 0+4+0+0+1+0+0+1=6. A total amount of change in the "glossiness of skin" is 0+2+0+0+1+0+0+1=4. According to the (long-term factor) 101a shown in FIG. 6, the amount of change in the "state of brain" is 0+1+0+0+0+0+0+1=2. The amount of change in the "state of heart" is 0+1+0+0+1+0+0+0=2.

Note that although only the "amount of facial wrinkles" and the "glossiness of skin" are shown in the left column of the future information (long-term factors) 101a shown in FIG. 5 for the sake of illustration, all the future state parameters (face image) shown in FIG. 4 are actually lined up in the left column of FIG. 5. Similarly, although only the "blood collection information", the "genome information", the "medical history" and the "family medical history" are shown in the upper row of the future information (long-term factors) 101a shown in FIG. 5 for the sake of illustration, all the long-term factors are actually lined up in the upper row of FIG. 5. The same applies to FIG. 6.

The amount of change in each future state parameter defined in FIG. 5 is a value weighted so as to be a larger value as a disease risk is higher. For example, it is known that a total cholesterol between 120 and 220 is a normal value, and a total cholesterol of less than or equal to 119 or more than or equal to 221 is an abnormal value. Consequently, the amount of change in each future state parameter is weighted so as to be larger in a case where the total cholesterol has an abnormal value than in a case where the total cholesterol has a normal value. In general, the blood collection information which is current biological information has a more profound influence on a disease risk than the medical history which is a clinical history in the past. Consequently, the amount of change in each future state parameter is weighted so as to be larger in the blood collection information than in the medical history. The same applies to FIG. 6.

Next, the determination unit 103 determines the amount of change in future state parameter corresponding to a short-term factor of the user with reference to the future information (short-term factors) 101b.

For example, in a case where the "number of steps" in the amount of exercise among the short-term factors is less than or equal to 8,000, in a case of more than or equal to 8,001, and in a case of more than or equal to 12,001 as shown in FIG. 7, the determination unit 103 determines that the amount of change in the "amount of facial wrinkles" is 0, −1, and −2, respectively. In a case where "jogging" is less than or equal to 20 minutes, in a case of 21 to 40 minutes, and in a case of more than or equal to 41, the amount of change in the "amount of facial wrinkles" is 0, −1, and −2, respectively. Similarly, in a case where the "sleep duration" is less than 7 hours, the amount of change in the "amount of facial wrinkles" is +1, and in a case of more than or equal to 7 hours, the amount of change in the "amount of facial wrinkles" is 0.

The determination unit 103 adds amounts of change corresponding to the short-term factors of the user for each type of future state parameters with reference to the future information (short-term factors) 101b. For example, in a case of a user whose number of steps on the previous day is 9,000, jogging on the previous day is for 23 minutes, sleep duration on the previous day is 8 hours, and who did not smoke on the previous day, the amount of change in the "amount of facial wrinkles" is −1−1+0+0=−2 according to the future information (short-term factors) 101b shown in FIG. 7. The amount of change in the "glossiness of skin" is −1−1+0+0=−2.

Note that although only the "amount of facial wrinkles" and the "glossiness of skin" are shown in the left column of the future information (short-term factors) 101b shown in FIG. 7 for the sake of illustration, all the future state parameters (face image) shown in FIG. 4 are actually lined up in the left column of FIG. 7. Similarly, although only the "amount of exercise", the "sleep habit", and the "smoking habit" are shown in the upper row of the future information (short-term factors) 101b shown in FIG. 7 for the sake of illustration, all the short-term factors are actually lined up in the upper row of FIG. 7. The same applies to FIG. 8.

The amount of change in each future state parameter shown in FIG. 7 is a value weighted so as to be a larger value as a disease risk is higher. For example, getting more than or equal to 7 hours of sleep duration is considered desirable. Consequently, the amount of change in each future state parameter is set to be larger in the case where the sleep duration is less than 7 hours than in the case of more than or equal to 7 hours. The same applies to FIG. 8.

Subsequently, the determination unit 103 sums up the amounts of change in respective future state parameters corresponding to the long-term factors of the user and the amounts of change in respective future state parameters corresponding to the short-term factors of the user, for each of the future state parameters, to determine each of the future state parameters of the user. For example, in a case where the amount of change in the "amount of facial wrinkles" determined based on the long-term factors is 40 and the amount of change in the "amount of facial wrinkles" determined based on the short-term factors is −5, the future state parameter of the "amount of facial wrinkles" of the user is 35. In a case where the amount of change in the "glossiness of skin" determined based on the long-term factors is 40 and the amount of change in the "glossiness of skin" determined based on the short-term factors is −10, the future state parameter of the "glossiness of skin" of the user is 30.

Note that the determination unit 103 may determine a future state parameter based on the amount of change in each future state parameter corresponding to the long-term factors of the user and the amount of change in each future state parameter corresponding to the short-term factors of the user instead of the above-described method.

FIG. 9 is a diagram showing an example of definition information to be utilized for determining a future state parameter. Although FIG. 9 only shows definition information about the "amount of facial wrinkles" among the future state parameters, similar definition information is actually prepared for all the types of future state parameters. The definition information may be stored in the storage unit 101.

The upper row of definition information T10 shown in FIG. 9 corresponds to a total value of the amounts of change in the "amount of facial wrinkles" corresponding to the respective long-term factors, and the left column corresponds to a total value of the amounts of change in the "amount of facial wrinkles" corresponding to the respective short-term factors. For example, assume that the total value of the amounts of change in the "amount of facial wrinkles" corresponding to the respective long-term factors is 100, and the total value of the amounts of change in the "amount of facial wrinkles" corresponding to the short-term factors is 3. In this case, the future state parameter of the "amount of facial wrinkles" of the user is "71" according to the definition information T10.

In step S130, the generation unit 104 generates the appearance future image and the organ future image of the user using the respective future state parameters (face image) and the respective future state parameters (organ). The generation unit 104 may process a face picture of the user captured in advance to generate the appearance future image of the user, or may process a face image prepared in advance like an avatar. At this time, the generation unit 104 generates a face image in such a manner that as each future state parameter (face image) has a larger value, the face picture of the user looks deteriorated. For example, the generation unit 104 generates a face image of the user in such a manner that between a case where the future state parameter of the "amount of facial wrinkles" is 10 and a case of 50, the amount of facial wrinkles is larger in the case of 50.

The generation unit 104 also generates an advice using the respective future state parameters (face image). For example, data in which the total value of values of the respective future state parameters and text data indicating an advice to be displayed are associated may be stored in the advice information 101d, and the generation unit 104 may acquire text data corresponding to the total value of values of the respective future state parameters from the advice information 101d to generate an advice. As an example, in the table, text data that "You have a healthy body. Keep this up to stay healthy", "You have an almost healthy body, but improve one's health a little more", and "If you do nothing, you will have this type of face. Improve one's health more." may be associated respectively with a case where the total value of the respective future state parameters is 0 to 200, a case of 201 to 500, and a case more than or equal to 501.

The generation unit 104 also generates an organ future image of the user by displaying an image of each organ prepared in advance in a color in accordance with the value of the future state parameter (organ) corresponding to each organ. For example, the likelihood of future occurrence of an abnormality in each organ may be displayed in a different color in accordance with the range of the value of the future state parameter (organ). For example, a case where the value of the future state parameter (organ) is less than 30, a case of 31 to 50, a case of 51 to 70, and a case of more than or equal to 71 may be respectively displayed in colors such as gray, yellow, orange, and red.

The generation unit 104 also generates an advice using the values of the respective future state parameters (organ). Similarly to the future state parameters (face image), information in which the value of each of the future state parameters and text data indicating an advice to be displayed are associated may be stored in the advice information 101d, and the generation unit 104 may acquire text data corresponding to the values of the respective future state parameters from the advice information 101d to generate an advice. As an example, the information may be associated with text data that "You have a healthy body. Keep this up to stay healthy", "You have an almost healthy body, but improve one's health a little more", and "If you do nothing, you will be in an unhealthy state. Improve one's health more.", respectively, for a case where the total value of the respective future state parameters is 0 to 200, a case of 201 to 500, and a case of more than or equal to 501.

In step S140, the output unit 105 causes a display to display the future images and the advice generated in the generation unit 104. The output unit 105 may cause an external information processing apparatus that communicates with the health support apparatus 10 to display the future images and the advice generated in the generation unit 104.

FIG. 10 is a diagram showing a display example of appearance future images. A screen A10 is an example of a screen for capturing a face picture of the user. A screen A11 is an example of a screen displaying a future image of the appearance (face) generated using the captured face picture of the user.

FIG. 11 is a diagram showing a display example of organ future images. A screen A20 is an example of a screen displaying the presence/absence of future occurrence of an abnormality. The example of the screen A20 shows that abnormalities are likely to occur in the brain, eyes, heart, kidney, blood vessels, and nerves in the future.

In step S200, the acquisition unit 102 acquires values of updated short-term factors. For example, an input screen for inputting item names of short-term factors and values of the respective items may be displayed on the screen of the health support apparatus 10, and the acquisition unit 102 may acquire the values inputted on the input screen as values of the short-term factors.

In step S210, the determination unit 103 updates future state parameters using the long-term factors acquired in step S100 and the updated short-term factors. The determination unit 103 acquires the amount of change in each of the future state parameters corresponding to the updated short-term factors with reference to the future information (short-term factors) 101b (FIG. 7 and FIG. 8). Subsequently, the determination unit 103 adds the amount of change in each of the future state parameters corresponding to the updated short-term factors to the value of each of the future state parameters determined in the processing step of step S120 to update the value of each of the future state parameters.

For example, assume that the future state parameter of the "amount of facial wrinkles" determined in step S120 is 35, and the amount of change in the "amount of facial wrinkles" determined in the processing step of step S210 is −2. In this case, the determination unit 103 updates the future state parameter of the "amount of facial wrinkles" to 33.

In step S220, the generation unit 104 generates an appearance future image and an organ future image of the user using the respective future state parameters (face image) and the respective future state parameters (organ) having been updated. The generation unit 104 also generates an advice using the respective future state parameters (face image) and the respective future state parameters (organ) having been updated.

Note that the generation unit 104 may compare the total value of values of the respective future state parameters (face image/organ) before updating and the total value of values of the respective future state parameters (face image/organ) after updating, and in a case where the total value is identical or has decreased, may generate an advice that "Keep this up!". On the other hand, in a case where the total value has increased, the generation unit 104 may generate an advice that "Getting worse than last time. Needs improvement".

In step S230, the output unit 105 causes the display to display the updated future images and the advice. A display example of the updated appearance future image is shown on a screen A12 in FIG. 10. A display example of the updated organ future image is shown on a screen A21 in FIG. 11.

In step S240, in a case where an instruction to terminate the process is received from the user, the health support apparatus 10 terminates the process. In a case where the instruction to terminate the process is not received, the processing steps from step S210 to step S230 are executed cyclically in accordance with a user operation.

In the above-described processing steps, the generation unit 104 may generate the appearance future image and the organ future image of the user by an active moving image, a 3D image, or a 3D object. The output unit 105 may also display the generated future images, the moving image, the 3D image, or the 3D object in a manner superimposed on an image of the real world or the real world utilizing an AR (augmented reality) technology, a MR (mixed reality) technology, or a hologram technology. Alternatively, the output unit 105 may display the generated future images, the moving image, the 3D image, or the 3D object in a virtual world utilizing a VR (virtual reality) technology.

<(Second) Processing Steps>

In (second) processing steps, the health support apparatus 10 calculates and displays a disease prediction score based on long-term factors. The health support apparatus 10 also generates and displays, as an advice about health to be presented to the user, an advice based on a current state of the user based on short-term factors in addition to the advice generated in the (first) processing steps (in the (second) processing steps, referred to as "an advice about a future state" for the sake of convenience). An "advice about health promotion of the user" in the description of the (second) processing steps corresponds to the "advice about the current state".

Figure 12:
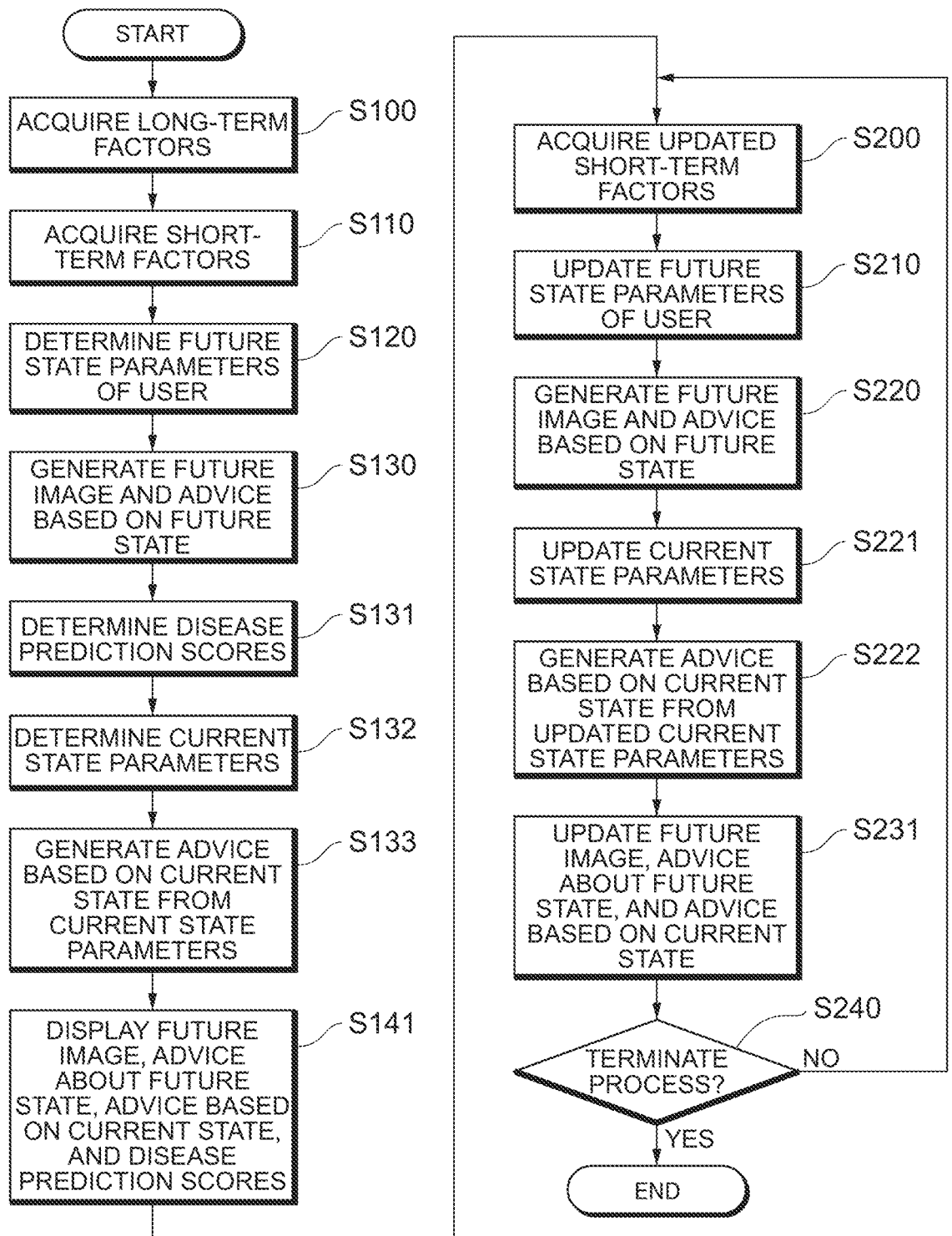

FIG. 12 is a flowchart showing an example of the (second) processing steps to be performed when the health support apparatus 10 displays future images of the user and the like. In FIG. 12, processing steps identical to the processing steps in FIG. 3 are denoted by identical reference characters, and description will be omitted.

In step S131, the determination unit 103 determines disease prediction scores of the user in accordance with the long-term factors about the user using the disease prediction information 101c. The disease prediction information 101c may be a parameter set of a learned model that when long-term factors are inputted, for example, outputs a disease prediction score. The determination unit 103 can obtain the disease prediction scores by inputting long-term factors to the learned model.

Examples of the disease prediction score include a result of determination about the metabolic syndrome and a risk of getting the metabolic syndrome in the future, a determination about the current presence/absence of dyslipidemia and a risk of developing dyslipidemia in the future, a risk of getting chronic liver disease, a determination about a current blood glucose state and a risk of future occurrence of diabetes, a current degree of obesity and a risk of getting obesity in the future, a current blood pressure and a risk of getting a high-blood pressure in the future, and the like.

In step S132, the determination unit 103 determines current state parameters for evaluating the current health state of the user from the short-term factors acquired in the processing step of step S110.

FIG. 13 is a diagram showing an example of current state parameters. Each of the current state parameters is expressed within the range of 0 to 100, for example, and a larger value indicates that the current health state of the user is better. Each of the current state parameters may be determined in any manner. For example, an "activity score" is determined based on the value of the "amount of exercise" which is a short-term factor. As the value of the amount of exercise is larger, the activity score also has a larger value. Similarly, a "sleep score" is determined based on the value of "sleep habit" which is a short-term factor, and a "smoking score" is determined based on the value of "smoking habit" which is a short-term factor. An "alcohol drinking score", a "stress score" and a "nutrition score" are also determined respectively based on an "amount of alcohol intake", "heart rate variations", "content of meals", and the like which are short-term factors.

In step S133, the generation unit 104 generates an advice about health promotion of the user using the short-term factors and/or each of the current state parameters. For example, information in which the range of value of each of the current state parameters and text data indicating an advice to be displayed are associated may be stored in the advice information 101d, and the generation unit 104 may acquire text data corresponding to the value of each of the current state parameters from the advice information 101d to generate an advice. Alternatively, the generation unit 104 may generate an advice by embedding values of the short-term factors and/or each of the current state parameters into the text data stored in the advice information 101d.

In step S141, the output unit 105 causes the display to display the future images, the advice about a future state, the advice about health promotion of the user which are generated in the generation unit 104, and the disease prediction scores. The output unit 105 may cause an external information processing apparatus that communicates with the health support apparatus 10 to display the future images, the advice, the advice about health promotion of the user which are generated in the generation unit 104, and the disease prediction scores.

FIG. 14 is a diagram showing an example of a screen displaying advices based on current state parameters. A screen A30 shows a display example of advices about health promotion of the user. The number of times of snacking, the number of times of taking a sweetened beverage, and the number of times of skipping breakfast are displayed in the advices. Such advices can be generated by embedding values inputted by the user as short-term factors into predetermined positions in the text data stored in the advice information 101d. When a button B30 is pressed down, a transition is made to a screen A31 that displays a "nutrition score" which is a current state parameter. The nutrition score of the user is displayed on the screen A31.

In step S221, the generation unit 104 generates respective current state parameters from updated short-term factors acquired in step S200. The method of generating a current state parameter is identical to the method in the processing step of step S132, and description is thus omitted.

In step S222, the generation unit 104 generates an advice about health promotion of the user using the updated short-term factors and/or each of the updated current state parameters. The method of generating an advice about health promotion of the user is identical to the method in the processing step of step S133, and description is thus omitted.

Note that the generation unit 104 may generate an advice about health promotion of the user based on a change in current state parameter. For example, the generation unit 104 may compare the value of a previous current state parameter and the value of a present current state parameter, and in a case where the value of the current state parameter has been improved from the previous value (that is, the value has decreased), may generate an advice such as "Keep this up!" for the user.

In step S231, the output unit 105 causes the display to display the updated future images, the advice about the future state, and the advice about the current state.

According to the above-described embodiment, the health support apparatus 10 generates and displays an image showing a future state of the appearance or organs of the user based on long-term factors and short-term factors of the user. By presenting to the user a future figure generated based on biological information on the user himself/herself rather than a future figure based on states of a disease and the like, it is possible to prompt the user to change his/her mindset to try to perform life improvement and health management.

The health support apparatus 10 also repeatedly acquires updated short-term factors in a cycle such as every day or every week, for example, and updates an image showing a future state of the appearance or organs of the user based on the long-term factors and the updated short-term factors. By a method of updating the image showing the future state of the appearance or organs of the user only based on the long-term factors, the image showing the future state of the appearance or organs hardly changes. If the image does not change, the user quickly becomes bored and has difficulty in keeping motivation to try to further continue life improvement and health management. On the other hand, the present embodiment updates the image showing the future state of the appearance or organs of the user using short-term factors that vary significantly. Thus, when the user continues life improvement and health management, the image showing the future state of the appearance or organs gradually changes to a healthier image. This enables the user to keep motivation to try to further continue life improvement and health management.

<(Third) Processing Steps>

In (third) processing steps, the health support apparatus 10 calculates a disease prediction score based on long-term factors. In addition, the health support apparatus 10 generates an advice about health of the user using the disease prediction score and current state parameters determined from short-term factors. The advice about health of the user generated in the (third) processing steps may be referred to as an "advice based on a future state and a current state". When generating the advice, information about whether or not the user has contracted a specific or a target disease can also be taken into account. In the processing steps, the advice generated as described above is displayed.

In the processing steps, neither an appearance future image nor an organ future image is used. Therefore, a component that generates and outputs an appearance future image or an organ future image may be omitted although the hardware configuration and the functional block configuration of the health support apparatus 10 shown in FIG. 1 and FIG. 2 may be used in an unchanged manner. For example, a functional block configuration example as in FIG. 15 can also be used without providing the first determination unit 1031, the second determination unit 1032, the third determination unit 1033, and the fourth determination unit 1034 in FIG. 2. Hereinafter, a functional block configuration example of the health support apparatus 10 in the processing steps will be described using FIG. 15.

Figure 16:
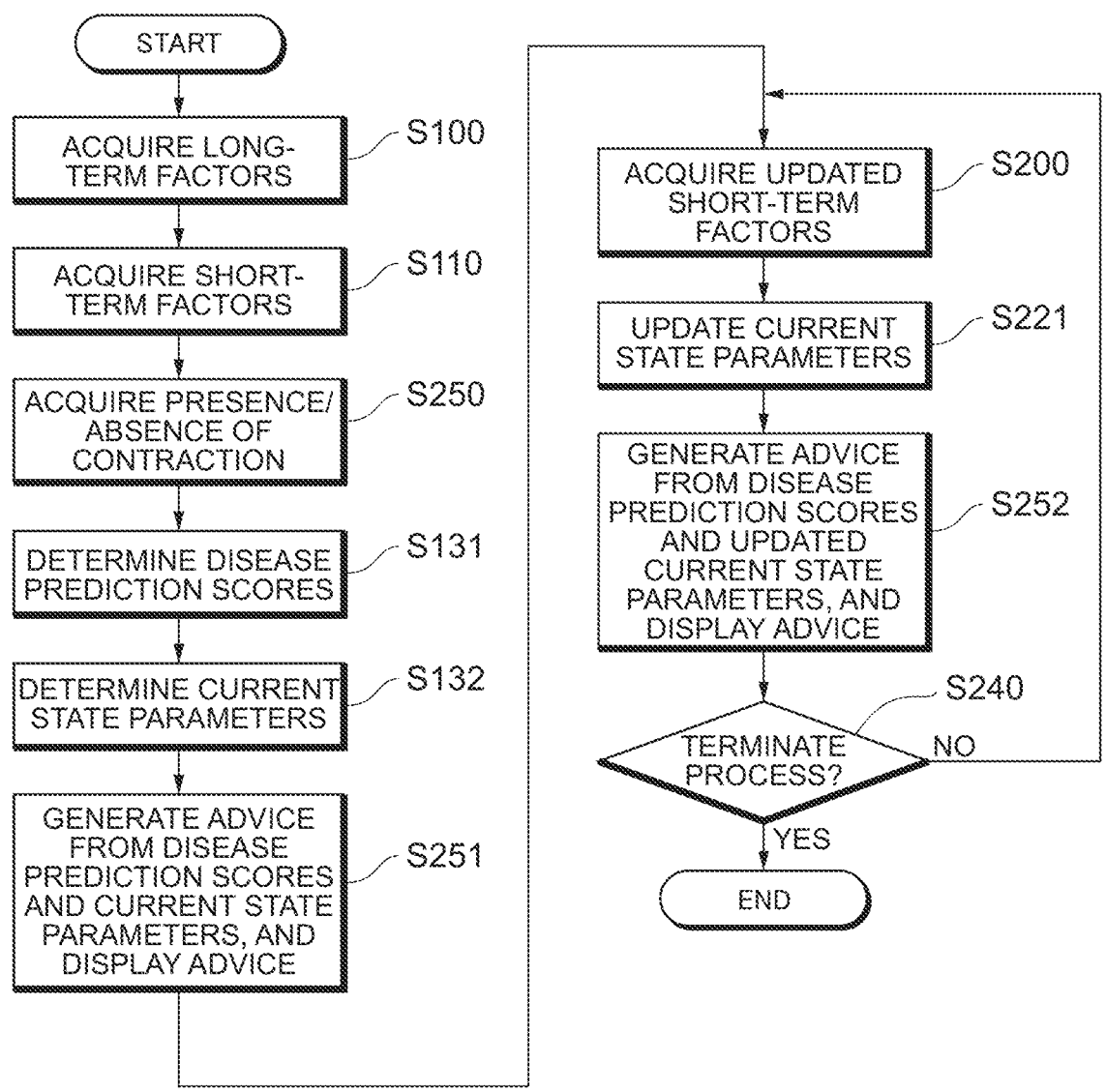

FIG. 16 is a flowchart showing an example of the (third) processing steps to be performed when the health support apparatus 10 analyzes the current state of the user based on short-term factors with reference to disease prediction scores determined based on long-term factors, and generates and displays an advice necessary for health maintenance or health restoration. In FIG. 16, processing steps identical to the processing steps in FIG. 3 are denoted by identical reference characters, and description will be omitted.

In step 250, information about whether or not a user who utilizes the health support apparatus 10 has contracted a specific or a target disease is acquired. The acquisition unit 102 acquires this information, and the disease contract information 101e of the storage unit 101 stores this information.

In step S131, the determination unit 103 determines disease prediction scores of the user in accordance with the long-term factors about the user using the disease prediction information 101c. The disease prediction information 101c may be, for example, a parameter set of a learned model that outputs disease prediction scores when long-term factors are inputted. The determination unit 103 can obtain the disease prediction scores by inputting long-term factors to the learned model.

The disease prediction scores include, for example, a result of determination about the metabolic syndrome and a risk of getting the metabolic syndrome in the future, a determination about the current presence/absence of dyslipidemia and a risk of developing dyslipidemia in the future, a risk of getting chronic liver disease, a determination about a current blood glucose state and a risk of future occurrence of diabetes, a current degree of obesity and a risk of getting obesity in the future, a current blood pressure and a risk of getting a high-blood pressure in the future, and the like.

In step S132, the determination unit 103 determines current state parameters of the user from the short-term factors acquired in the processing step of step S110. The current state parameters shown in FIG. 13 can be utilized as an example.

In step S251, the generation unit 104 generates an advice about health of the user using the disease prediction scores and the short-term factors and/or each of the current state parameters. More specifically, an advice about health promotion of the user is generated based on a correlation between the disease prediction scores and the short-term factors and/or each of the current state parameters. The output unit 105 causes the display to display the advice generated in the generation unit 104. Then, in a case where information indicating that the user has contracted the specific or the target disease is acquired in step 250, the advice generated here is set to have more stringent content. For example, in a case where information indicating that the user has contracted the metabolic syndrome is not acquired although the disease prediction score about the risk of getting the metabolic syndrome in the future is a high score, the sleep score and the alcohol drinking score which are the short-term factors and/or each of the current state parameters are low, and the nutrition score is high, advices such as "If nothing is done, you are likely to contract the metabolic syndrome.", "Reduce sweets to X times a week.", and "Abstain from drinking soft drink." are generated. On the other hand, in a case where information indicating that the user has contracted the metabolic syndrome is acquired in the above example, advices such as "Cut out sweets for a while. First, get through today." and "Drink soda water instead of soft drink." are generated.

In the processing steps, the advices are generated in accordance with a correlation between the disease prediction scores and the short-term factors and/or each of the current state parameters, and further taking into account information about whether or not the user has contracted the specific or the target disease. The advices are generated in the following manner, for example.

As a specific example, in accordance with respective risks in the disease prediction scores and respective parameters of the long-term factors, each of these risks or parameters is weighted, and information about the presence/absence of disease contraction is detected, and then, the correlation between the disease prediction scores and the short-term factors and/or each of the current state parameters is processed in line with a certain procedure (algorithm), so that the advices can be generated. Alternatively, advices may be generated using a parameter set of a learned model that outputs advices when the disease prediction scores, the short-term factors and/or each of the current state parameters, and the information about the presence/absence of disease contraction are inputted. In this case, the generation unit 104 can obtain advices by inputting the disease prediction scores, the short-term factors and/or each of the current state parameters, and the information about the presence/absence of disease contraction to the learned model.

Screens identical to the screens in FIG. 14, for example, can be used as screens for displaying advices generated based on the disease prediction scores and the short-term factors and/or each of the current state parameters.

In step S221, the generation unit 104 generates each of the current state parameters from the updated short-term factors acquired in step S200. The method of generating a current state parameter is identical to the method in the processing step of step S132, and description is thus omitted.

In step S252, the generation unit 104 generates an advice about health promotion of the user using the disease prediction scores, the updated short-term factors and/or each of the updated current state parameters, or based on a correlation between the disease prediction scores, the updated short-term factors and/or each of the updated current state parameters. The method of generating an advice about health promotion of the user is identical to the method in the processing step of step S251, and description is thus omitted. The output unit 105 causes the display to display the advices generated in the generation unit 104.

Note that the generation unit 104 may generate an advice about health promotion of the user based on the disease prediction scores and changes in current state parameters. For example, the generation unit 104 may compare the value of a previous current state parameter and the value of a present current state parameter, and in a case where a disease prediction score is a score indicating that the risk of a predetermined disease is high although the value of a current state parameter has been improved from a previous value (that is, the value has decreased), an advice such as "Keep this up. Gradually improved. Carry on this way!" may be generated for the user.

In the processing step of step S251, the generation unit 104 may further generate a menu that the user should work on every day as a health behavior. The output unit 105 may also cause the display to display the menu generated in the generation unit 104. The menu generated in the generation unit 104 may be a menu selected from among a plurality of menus based on a questionnaire inputted by the user, or a menu selected from among a plurality of menus based on the disease prediction scores and/or current state parameters. For example, the generation unit 104 may generate a menu such as "walk after meal" for a user whose risk value of the metabolic syndrome which is a disease prediction score is more than or equal to a predetermined threshold value.

The menu may be classified into a plurality of categories, and a plurality of menus may be prepared for each of the categories. Examples of categories may include meal, exercise, smoking, drinking, sleep, and stress. The generation unit 104 may also generate a menu by selecting a menu to be presented to the user from among a plurality of menus corresponding to a category selected by the user based on the disease prediction scores or current state parameters. For example, for a user whose risk value of the metabolic syndrome is more than or equal to a predetermined threshold value and who has selected the category of meal, a menu such as "Try not to drink sweetened drinking water" may be generated, and for a user who has selected the category of drinking, a menu such as "Try not to drink alcohol" may be generated.

The generation unit 104 may also generate a score for each predetermined period (such as a day or a week) based on the degree of accomplishment of a menu that the user should work on every day as a health behavior. Input of whether or not the menu has been accomplished may be accepted every day from the user.

Figure 17:
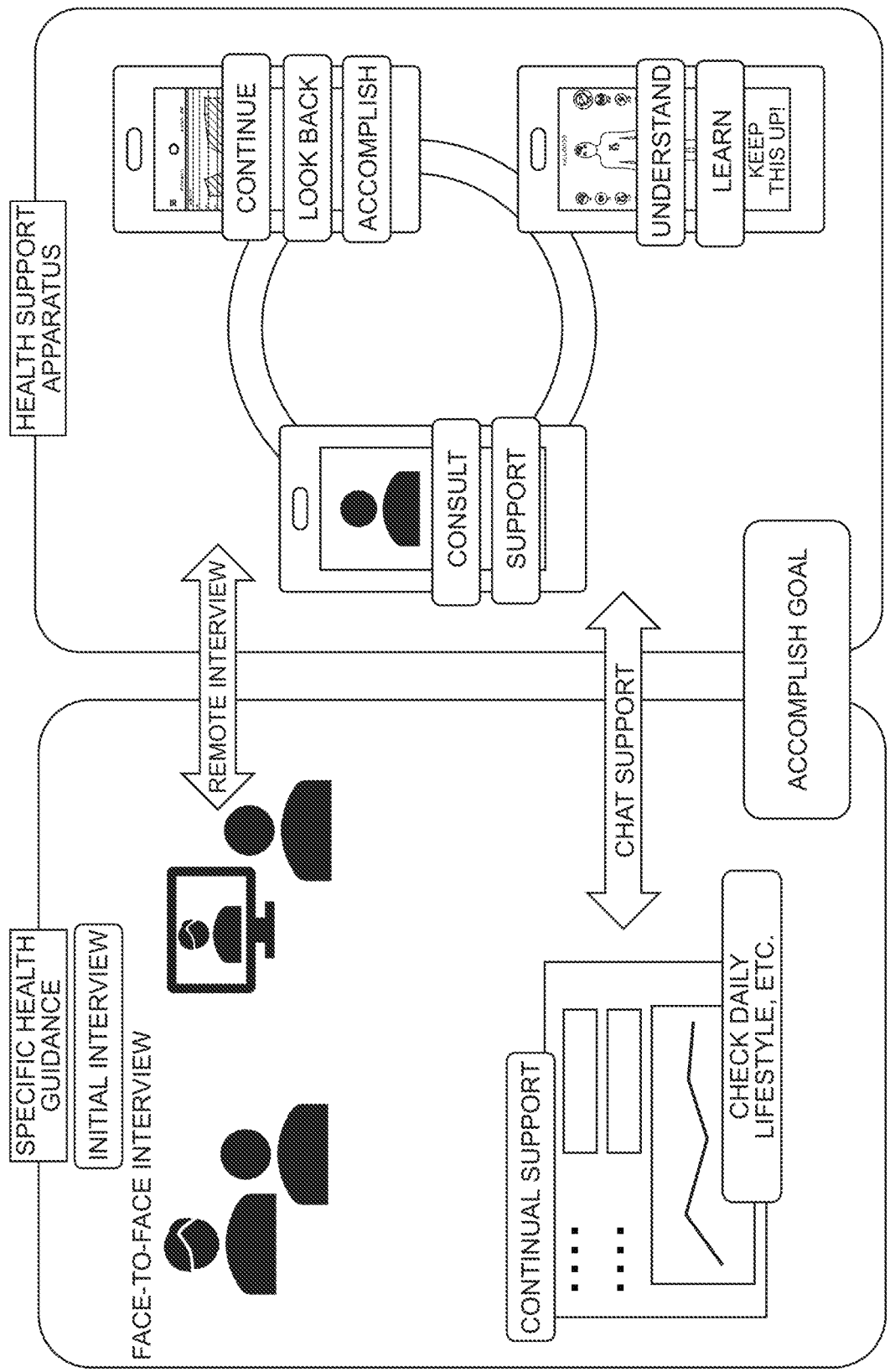
FIG. 17 is a diagram showing an example of a method of utilizing the health support apparatus.

The health support apparatus 10 according to the present embodiment can be utilized in a specific health guidance by a public health nurse or the like after taking a lifestyle disease screening (specific checkup) and further for checking effects after the specific health guidance as shown in FIG. 17, for example. The specific health guidance is a health guidance performed for a person requiring improvement in lifestyle habit in accordance with a risk value of the metabolic syndrome after taking the lifestyle disease screening (specific checkup). On that occasion, an instructor can also perform the specific health guidance face-to-face or remotely utilizing an instructor terminal apparatus connected to the health support apparatus 10 and with reference to the advice generated in the health support apparatus 10. The health support apparatus 10 can also be utilized when the user performs life improvement and health management after the specific health guidance. For example, the user can change his/her behavior using as a reference a menu displayed on the screen of the health support apparatus 10 that should be worked on every day as a health behavior, and can identify progress of life improvement with reference to an appearance and an organ future images of the user. In a case where the user wishes to consult counseling staff about health, the user can also operate the health support apparatus 10 to request support through chatting from the counseling staff. Since the user has not contracted a specific or a target disease in principle in the case of utilizing the health support apparatus 10 for such an application, the step of acquiring information about the presence/absence of contraction in step S250 of FIG. 16 can be omitted. The generation unit 104 may generate an instructor reference advice and a user reference advice as advices, and in this case, the respective reference advices may have different content.

The health support apparatus 10 according to the present embodiment can also be used for aiding a physician's diagnosis for a patient having contracted the metabolic syndrome, for example. Specifically, when performing a physical examination, a physician can determine the adequacy of the advice generated in the health support apparatus 10 and utilize the advice. The health support apparatus 10 can also be used when a user (having contracted the metabolic syndrome) who has taken a physical examination performs life improvement in exercise, dietary life, sleep, and the like in accordance with a physician's instruction after the physical examination. The health support apparatus 10 may also generate a menu that the user should work on every day as a health behavior (such as a lifestyle habit improvement goal) for categories such as meal, exercise, smoking, drinking, sleep, and stress in response to a physician's instruction. The generated menu may be displayed on the screen of the health support apparatus 10 utilized by the user. The physician can utilize the health support apparatus 10 when providing the user with continual guidance about these categories. Note that the health support apparatus 10 may be divided into an apparatus (such as a server or a cloud server) that generates the menu in response to a physician's instruction and a terminal utilized by the user.

The above-described embodiment is intended for facilitating understanding of the present disclosure, and not intended for limited interpretation of the present disclosure. The flowcharts described in the embodiment, sequences, respective elements included in the embodiment and their arrangement, materials, conditions, shapes, sizes, and the like are not limited to those illustrated, and can be changed as appropriate. Components described in different embodiments can be partially replaced or combined. Although a user receives services such as an increase in motivation, mindset improvement, health guidance, and diagnosis support based on the health support apparatus, the health support method, and the program of the present disclosure, a subject that implements the present disclosure is a business operator that operates, handles, and manages the health support apparatus, the health support method, and the program of the present disclosure to provide a user with the above-described services.

REFERENCE SIGNS LIST 10 health support apparatus
11 processor
12 storage device
13 communication IF
14 input device
15 output device
101 storage unit
101a future information (long-term factors)
101b future information (short-term factors)
101c disease prediction information
101d template information or advice information
101e disease contract information
102 acquisition unit
103 determination unit
104 generation unit
105 output unit

The invention claimed is:

1. A health support apparatus comprising:
a processor, wherein the processor is configured to:
acquire a long-term factor which is data indicating health of a target user and does not change or changes by less than a predetermined amount in a predetermined period and a short-term factor which is data indicating health of the target user and changes by more than or equal to the predetermined amount in the predetermined period;
determine a future state parameter of the target user based on the long-term factor and the short-term factor, wherein the short-term factor is updated repeatedly after the long-term factor is acquired; and
generate an image showing a future state of an appearance or an image showing a future state of an organ of the target user using the determined future state parameter of the target user; and
a display configured to output the generated image,
whereby the health support apparatus is thereby usable to prompt a user with specific health guidance.

2. The health support apparatus according to claim 1, further comprising:
a storage medium configured to save first future information indicating a correspondence relationship between the long-term factor and a degree of change in the future state parameter for generating the image showing the future state of the appearance or the image showing the future state of the organ, and second future information indicating a correspondence relationship between the short-term factor and the degree of change in the future state parameter,
wherein the processor is configured to:
determine the degree of change in the future state parameter in accordance with the long-term factor about the target user with reference to the first future information;
determine the degree of change in the future state parameter in accordance with the short-term factor about the target user with reference to the second future information; and
determine the future state parameter of the target user based on the degree of change in the future state parameter determined in accordance with the long-term factor and the degree of change in the future state parameter determined in accordance with the short-term factor, wherein
the generated image shows the future state of the appearance or the future state of the organ of the target user using the determined future state parameter of the target user.

3. The health support apparatus according to claim 2, wherein
the first future information indicates a correspondence relationship between each of a plurality of types of the long-term factor and a degree of change in each of a plurality of types of the future state parameters,
the second future information indicates a correspondence relationship between each of a plurality of types of the short-term factor and the degree of change in each of the plurality of types of the future state parameters, and
the processor is configured to:
determine the degree of change in each type of the future state parameters in accordance with the plurality of types of the long-term factor about the target user with reference to the first future information;
determine the degree of change in each type of the future state parameters in accordance with the plurality of types of the short-term factor about the target user with reference to the second future information;

determine each type of the future state parameters of the target user based on the degree of change in each type of the determined future state parameters; and generate the image showing the future state of the appearance or the image showing the future state of the organ of the target user using each type of the determined future state parameters of the target user.

4. The health support apparatus according to claim 2, wherein the processor is configured to:

acquire the short-term factor about the target user having been updated;

determine an updated degree of change in the future state parameter in accordance with the short-term factor about the target user having been updated with reference to the second future information;

determine the future state parameter of the target user having been updated based on the degree of change in the future state parameter determined in accordance with the long-term factor and an updated degree of change in the future state parameter determined accordance with the short-term factor; and wherein the display is configured to generate an image showing the future state of the appearance or the future state of the organ of the target user using the future state parameter of the target user having been updated and determined by the processor.

5. The health support apparatus according to claim 2, wherein the storage medium saves disease prediction information for determining a disease prediction score indicating a likelihood of future occurrence of a disease from the long-term factor, wherein the processor is further configured to:

determine a disease prediction score of the target user in accordance with the long-term factor about the target user using the disease prediction information, wherein the display outputs the determined disease prediction score of the target user.

6. The health support apparatus according to claim 2, wherein the storage medium saves template information for generating advice about health, and the processor is configured to:

generate the advice about health of the target user by embedding in the template information a value included in the long-term factor about the target user, a value included in the short-term factor about the target user, or a value calculated based on the long-term factor about the target user or the short-term factor about the target user, and the display is configured to output the generated advice about health to be presented to the user.

7. A health support method to be executed by a health support apparatus, comprising:

acquiring a long-term factor which is data indicating health of a target user and does not change or changes by less than a predetermined amount in a predetermined period and a short-term factor which is data indicating health of the target user and changes by more than or equal to the predetermined amount in the predetermined period;

determining a future state parameter of the target user based on the long-term factor and the short-term factor, wherein the short-term factor is updated repeatedly after the long-term factor is acquired;

generating an image showing a future state of an appearance or an image showing a future state of an organ of the target user using the determined future state parameter of the target user; and outputting the generated image, whereby the health support apparatus is thereby usable to prompt a user with specific health guidance.

8. A health support apparatus comprising:

a processor, the processor configured to:

acquire a long-term factor which is data indicating health of a target user and does not change or changes by less than a predetermined amount in a predetermined period and a short-term factor which is data indicating health of the target user and changes by more than or equal to the predetermined amount in the predetermined period;

determine a disease prediction score based on the long-term factor, and determine a current state parameter based on the short-term factor, wherein the short-term factor is updated repeatedly after the long term factor is acquired; and generate advice about health of the target user based on a correlation between the disease prediction score and the short-term factor or the current state parameter; and a display configured to output the generated advice, whereby the health support apparatus is thereby usable to prompt a user with specific health guidance.

9. The health support apparatus according to claim 8, wherein the processor generates the advice further using information about whether or not the target user has contracted a specific or a target disease.

10. The health support apparatus of claim 1, wherein the future state parameter is expressed within a range of 0 to 100, wherein a larger value of the future state parameter indicates a higher risk of occurrence of an abnormality or disorder.

11. The health support apparatus of claim 2, wherein the degree of change in the future state parameter is weighted to be larger as a disease risk is higher.

* * * * *